United States Patent [19]
Alkhamis

[11] Patent Number: 5,873,249
[45] Date of Patent: Feb. 23, 1999

[54] ENERGY GENERATING SYSTEM USING DIFFERENTIAL ELEVATION

[76] Inventor: Mohammed Alkhamis, P.O Box 85069, Riyadh 11691, Saudi Arabia

[21] Appl. No.: 887,604

[22] Filed: Jul. 3, 1997

[51] Int. Cl.⁶ .................................................. F03B 7/00
[52] U.S. Cl. ............................................. 60/639; 60/675
[58] Field of Search ........................................ 60/639, 675

[56] References Cited

U.S. PATENT DOCUMENTS

| | | |
|---|---|---|
| 1,085,703 | 2/1914 | Rochelle . |
| 3,953,971 | 5/1976 | Parker . |
| 4,187,686 | 2/1980 | Pommier . |
| 4,318,275 | 3/1982 | Brown et al. . |
| 4,760,706 | 8/1988 | Nasser . |
| 5,255,519 | 10/1993 | Kakovitch . |
| 5,488,828 | 2/1996 | Brossard . |

FOREIGN PATENT DOCUMENTS

| | | | |
|---|---|---|---|
| 58-18572 | 2/1983 | Japan | ................................. 60/675 |
| 2224807 | 5/1990 | United Kingdom | ..................... 60/675 |

*Primary Examiner*—Noah P. Kamen
*Attorney, Agent, or Firm*—Larson & Taylor

[57] ABSTRACT

A system generates energy using the difference in elevation between an upper elevation (e.g., at the top of a mountain) and a lower one (e.g., at or near the bottom of the mountain.) In one embodiment, the system includes a compressor located at the upper location which supplies compressed gas through a conduit to a mixing chamber at the lower elevation. A control unit connected to the conduit supplies pulses of the compressed gas to the mixing chamber for mixing with mercury to produce a mercury-gas mixture. An injector injects pulses of the mercury-gas mixture into a turbine so as to impact against the turbine blades and drive the turbine. In further embodiments, the elevation differential is employed in combination with a pair of weights which are raised and lowered between the two elevations and which are used, when lowered, to generate a driving force for respective turbines.

6 Claims, 3 Drawing Sheets

5,873,249

ENERGY GENERATING SYSTEM USING DIFFERENTIAL ELEVATION

FIELD OF THE INVENTION

The present invention relates to an improved energy generating system which, in part, derives or generates energy based on a large differential elevation between different parts of the system.

BACKGROUND OF THE INVENTION

It is an understatement to say that an extremely large amount of research has gone into developing existing energy sources, as well as exploring alternative energy sources such as a solar, tidal and wind energy.

As indicated above, the present invention is concerned, in part, with using the difference in elevation between different parts of the system in generating energy. Patents of interest in this particular field include the following U.S. Pat. Nos.: 3,953,971 (Parker); 5,255,519 (Katovitch); 4,760,706 (Nasser); 5,488,828 (Brossard); 4,318,275 (Brown et al.); 4,187,686 (Pommier); and 1,085,703 (Rochelle).

Briefly considering these patents, the Parker patent discloses a system for generating power wherein liquid stored at a higher elevation travels down a conduit to a power generation unit at a lower elevation. The liquid is then vaporized and heated before traveling up a conduit back to the higher elevation where the vapor condensed to a liquid for reuse. The Katovitch patent discloses a power generation system wherein helium is utilized as a working recycled fluid which is heated to convert the fluid to a vapor form for powering a generator. The Nasser, Brossard, and Brown et al. patents each disclose a power generation system wherein a coolant is evaporated a lower position, allowed to rise via tubing to a higher position, liquefied at the higher position, and then allowed to flow down to the lower position where the liquid drives a turbine connected to a generator. The Pommier patent discloses a power generation system wherein fluid is warmed at a lower level to convert the fluid to a gas and cooled at an upper level to convert the gas back to a fluid. The hydraulic pressure of the liquid moving from the upper level to the lower level is used to generate power. The Rochelle patent discloses a water motor which utilizes water, and gravity, to pull down buckets from an upper elevation and thereby generate energy.

SUMMARY OF THE INVENTION

In accordance with the invention, an energy generating system is provided which, in part, derives or generates energy based on a large differential in elevation between different parts of the system, e.g., between parts of the system located at or near the top of a mountain and other parts of the system located at or near the bottom of the mountain. Among the suitable candidate locations for the system is the mountain of Sarawat in the Kingdom of Saudi Arabia which is a relatively high mountain having a steep face, about 2400 m. above sea level.

In accordance with a first aspect of the invention, a system is provided for generating energy using the difference in elevation between a relatively high elevation and a relatively low elevation, the system comprising: a compressor located at the relatively high location for compressing a vapor form of a working medium into a compressed gas; a first conduit for conveying the compressed gas to the relatively low elevation; a mixing chamber at the relatively low elevation; mercury supply means for supplying mercury to the mixing chamber; control means connected to the first conduit for supplying pulses of the compressed gas to said mixing chamber for mixing with the mercury to produce a mercury-gas mixture; a turbine having turbine blades; injecting means for injecting pulses of the mercury-gas mixture into the turbine so as to impact against the turbine blades and drive the turbine; separator means for recovering the mercury and gas from the turbine and for separating the gas from the mercury; connector means for conveying mercury separated from the gas to the mercury supply means; and a further conduit for conveying gas separated from the mercury to the compressor. Preferably, the control means comprises a control valve connected to said conduit and having an open state wherein the compressed gas is supplied to said mixing chamber and a closed state wherein the compressed gas is blocked from the mixing chamber, and an electrical control means for providing periodical opening and closing of the control valve to generate said pulses. Advantageously, the valve comprises a rotary valve.

The mixing chamber preferably includes an internal electric heater for heating the mercury and gas supplied to the chamber. The injecting means preferably includes a connection between the mixing chamber and the turbine for increasing the rate of injection of the mercury-gas mixture into said turbine.

Preferably, the system further comprises heating means for heating the mercury prior to supplying of the mercury to the mixing chamber. The heating means preferably comprises at least one heater tank containing mercury, and supply means for supplying gas from the separator means to a bottom portion of the tank such that the gas bubbles up through the mercury in the tank to thereby cause heating of the mercury. Advantageously, the separator means comprises a separator tank containing mercury and defining a mercury level, the separator tank including an inlet connected to said turbine, an outlet disposed below the mercury level for supplying mercury to the at least one heater tank, and an outlet at an upper portion of said separator tank for supplying gas to said at least one heater tank.

In a preferred implementation of the embodiment described above, at least one heater tank comprises a plurality of interconnected heater tanks arranged in serial relation and disposed at different, increasing heights, in sequence, beginning with the heater tank connected to the separator tank. The system preferably further comprises a gas pipe connector for connecting each heater tank to the next adjacent heater tank in sequence, and an electrically controlled, cyclically operated rotary valve connected in each gas pipe connection. Advantageously, the rotary valves are controlled to cyclically operate at different, decreasing rates beginning with the heater tank connected to the separator tank. Preferably, these rates decrease, in sequence, by a factor of two, beginning with the heater tank connected to said separator tank.

The supply means preferably comprises a connection conduit of a first diameter connected to the separator tank and a plurality of connecting pipes of diameters smaller than said first diameter connected between the connector conduit and the bottom portion of the heater tank. Advantageously, each of the pipes includes an outlet end opening into the heater tank and an air filled float valve located at the outlet end.

The mixing chamber preferably includes an ovoid shaped cavity. Advantageously, the mixing chamber includes an ovoid shaped heater therein.

According to a further aspect of the invention, a system is provided for generating energy using the difference in elevation between a relatively high elevation and a relatively low elevation, the system comprising: a first container; a first lifting device for lifting the first container from the relatively low elevation to the relatively high elevation, and for enabling lowering of the first container from the relatively high elevation to the relatively low elevation; a second container; a second lifting device for lifting the second container from the relatively low elevation to the relatively high elevation and for enabling lowering of the second container from the relatively high elevation to the relatively low elevation; a first generator associated with the first lifting device; first conversion means for converting energy produced during lowering of the first container into a driving force for the first generator; a first electric motor for driving the first lifting device during lifting of the first container; a second generator associated with the second lifting device; second conversion means for converting energy produced during lowering of the second container into a driving force for the first generator; a second electric motor for driving the second lifting device during lifting of the second container; and means for supplying weight augmenting matter to the containers at the relatively high elevation for discharge from the containers at the relatively low elevation.

In a first embodiment of this aspect of the invention, the weight augmenting matter comprises a liquified gas which is converted to a lower pressure gas at said relatively low elevation, and the system further comprises a first pipe system for piping the lower pressure gas, after discharge from said containers, from the relatively low elevation to the relatively high elevation, a compressor, located at the relatively high elevation and connected to the first pipe system, for compressing gas supplied from the first pipe system to produce the liquified gas, and a second pipe system connected to the compressor for supplying the liquified gas from the compressor to said containers.

In a further embodiment of this aspect of the invention, the weight augmenting matter comprises water and the system further comprises, located at the relatively high elevation, a water storage tank and piping means for supplying water from the water storage tank to the containers.

In a further embodiment, the weight augmenting matter comprises snow supplied to the containers at the relatively high elevation.

In accordance with yet another aspect of the invention, a system is provided for generating energy using the difference in elevation between a relatively high elevation and a relatively low elevation, the system comprising: a weight; a lifting device for lifting the weight from the relatively low elevation to the relatively high elevation and for enabling lowering of the weight from the relatively high elevation to the relatively low elevation; a generator for producing electrical energy for consumption; means for converting energy produced by said lifting device during lowering of said weight into drive energy for driving said generator; an electric motor for driving said lifting device to provide lifting of said weight and for driving said generator; and an intermittently operating energy source for supplying electrical energy to the electric motor during operation of the energy source to drive the generator and to enable lifting of the weight by the lifting device whereby the weight can be lifted during operation of the energy source to provide potential energy for the system. In one preferred embodiment, the energy source comprises a solar powered energy source. In a further preferred embodiment, the energy source comprises a wind powered energy source.

Other features and advantages of the invention will be set forth in, or apparent from, the detailed description of the preferred embodiments of the invention which is found hereinbelow.

DESCRIPTION OF THE PREFERRED EMBODIMENTS

Figure 1:
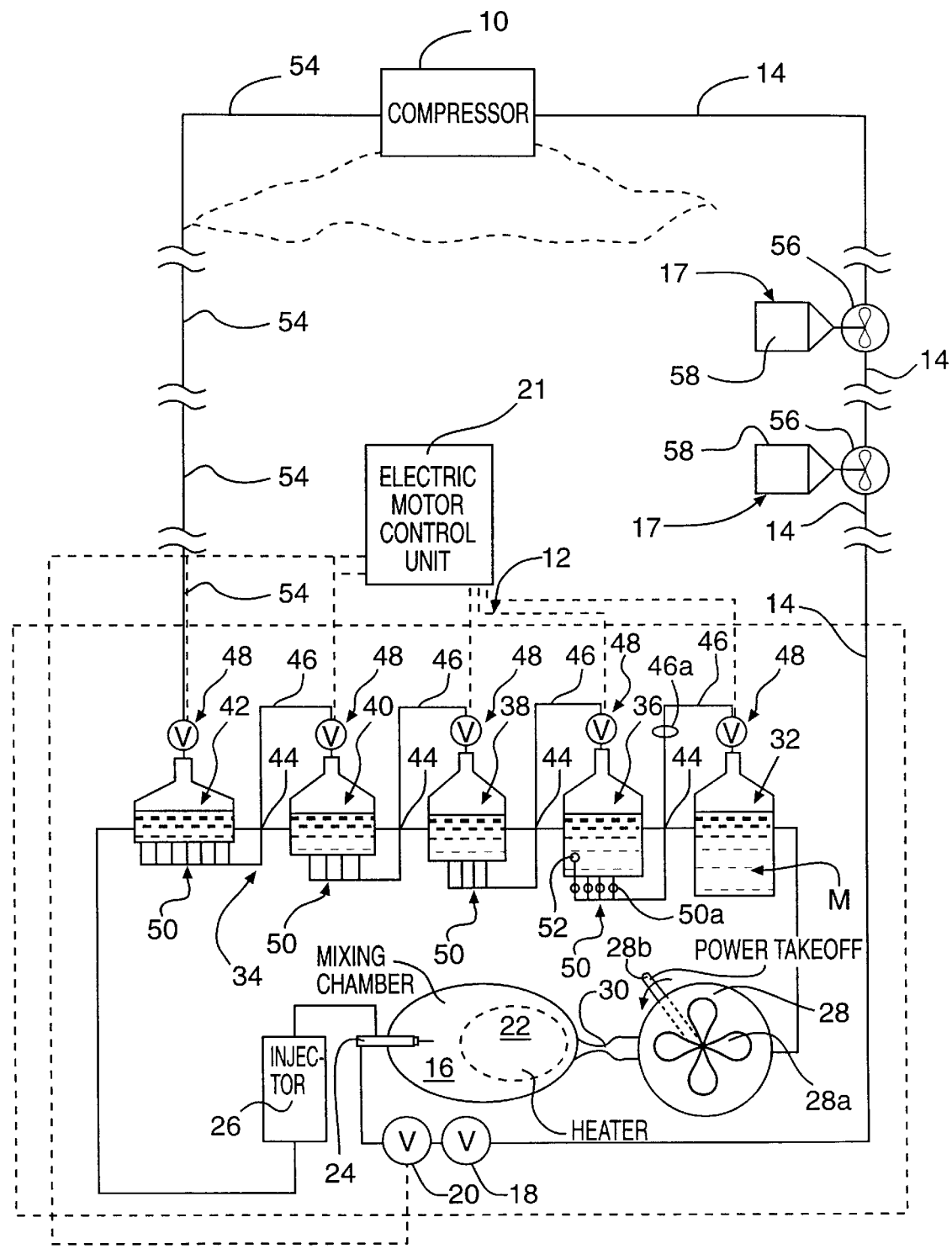
FIG. 1 is a schematic diagram of an energy generating system in accordance with a first preferred embodiment of the invention.

Referring to FIG. 1, there is shown a schematic representation of a energy generating system in accordance with a first embodiment of the invention. The system includes a compressor 10 located at or near the top of a mountain or, more generally, at a high relative differential elevation with respect to the rest of the system, the latter being indicated as a unit denoted 12.

Compressed gas is conveyed from compressor 10 down the mountain through a supply line 14 to a mixing chamber 16 of unit 12. Connected in the supply line 14 at various spaced points along the descent thereof down the mountain are turbine-generator units 17 described in more detail hereinbelow. A main valve 18 connected in supply line 14 upstream of chamber 16 serves, when closed, to block the gas in line 14 from reaching chamber 16. An electrically driven rotary ball valve 20, connected in line 14 between valve 18 and chamber 16, is driven by an electric motor control unit 21 which also drives additional rotary ball valves described below.

Mixing chamber 16, which is, as shown, preferably "egg-shaped" or elliptical, includes an electric heater 22 which is also preferably egg-shaped, as shown, and which, in use, heats the contents of chamber 16. The volume of the chamber 16, or, stated differently, the distance between the longitudinal center line of the chamber and the inner wall surface, is selected to be the greatest at the center of the chamber and the smallest near the chamber outlet. An injector nozzle 24 receives compressed gas from line 14 as well as hot mercury from an injector unit 26. The heater 22 heats both the gas and mercury in chamber 16 and the hot mixture supplied from chamber 16 in shock waves or pulses controlled by rotary valve 20. In particular, the timing and duration of these shock waves or pulses is controlled by opening and closing times of valve 20 under the control of the electric motor control unit 21 referred to above.

A turbine 28 is connected to chamber 16 through a venturi connection 30, and is driven by the shock waves or pulses of the hot mixture of mercury and gas referred to above. The venturi connection 30 accelerates the flow rate of the mixture. The distance between the turbine 28 and mixing chamber 16 should be chosen to provide the maximum rate of speed for the pulses of the mercury and gas mixture so as to exert the optimum force on the turbine 28. Further, the blades 28a of turbine 28 should be shaped so as to maximize the driving force produced thereon by the pulses. The overall operation of this aspect of the system is roughly similar to that of an air gun wherein pulses of air are used to generate propulsive forces. A power take-off shaft for turbine 28 is indicated at 28a.

The compressed gas and mercury in turbine are recycled from the turbine to a separation tank 32 wherein the gas rises to the top and the mercury, indicated at M, collects at the bottom of the tank. Separation tank 32 is connected to a system of further heater tanks, generally denoted 34. These tanks are of different sizes and are disposed at different levels, as shown. In the embodiment illustrated, four tanks 36, 38, 40 and 42 are employed. The mercury M from separation tank 32 is transferred in the other tanks, in sequence, through a series of connecting pipes 44. Similarly, gas is made to flow or pass from separation tank 32 through the other tanks, in sequence, through a further series of connecting pipes 46. An electrically-operated rotating ball valve 48 is connected to the output of each of the tanks 32, 36, 38, 40 and 42 at one end of pipes 46 and while, at the other end, each of the pipes 46 branches into a plurality of a small thin pipes 50 which extend into the corresponding tank. As indicated by circle 46*a* and circle 50*a*, the diameter of pipe 46 is greater than that of thin pipes 50.

As noted above, each of the tanks is disposed, as viewed from the left of FIG. 1, at a higher level than the next adjacent tank so as to minimize the quantity of mercury required. Float valves, one of which is indicated schematically at 52, are filled with air to reduce the pressure exerted by the mercury and thus assist the gas to travel upwardly through the collected mercury to the space thereabove. The float valves 52, with their floating balls, control the flow of mercury for each tank. The valves 52 reduce the high pressure of the mercury on the small pipes 50 themselves to enhance the travel of the gas through the mercury. Thin curved pipes corresponding to pipes 50 can also be employed. The curvature of such pipes can be used to reduce the pressure of the mercury thereon in the manner of the curve of a medical thermometer.

As the gas travels through the mercury in the form of bubbles, each bubble will be under high pressure (thirteen times the pressure of water) thereby creating friction and generating heat. The heat increases in the following tanks in sequence, i.e., tanks 36, 38 and 40, and is absorbed in the relatively shallow mercury pool in the last tank 42.

The aforementioned rotary valves 48 associated with the heater tanks 46 control the pressure from the mixing chamber 16 wherein shock waves are produced to assist in injecting the gas and mercury mixture. Preferably, the rotational speed of each valve 48 will differ and the speeds will vary in a predetermined pattern. In a specific implementation, the valve 48 for separation tank 32 will rotate at 960 revolutions per minute (rpm), that for tank 36 will rotate at 480 rpm, that for tank 38 at 240 rpm, that for tank 42 at 120 rpm, and that for the final tank 40 at 60 rpm. In this way, hammering waves or pulses are created at twice the rate as the previous tank to help in forcing or pushing the gas through the mercury.

The gas from the last tank 42 in the series is transported through piping indicated at 54 to the compressor 10 at the top of the mountain for compression and continuation of the cycle. It will be, of course, appreciated that other units may be located at the top of the mounting along with condenser 20 including a liquid reservoir or gas storage tank (not shown) and control valving (not shown).

As is believed to be evident from the foregoing description of the overall system, in operation, gas under pressure from compressor 10 is routed down through pipeline or supply conduit 14 to the level of unit 12 wherein the gas is under high pressure. The gas is supplied to mixing chamber 16 along with mercury injected by injector unit 26 for mixing and heating by heater 22. The hot mercury-gas mixture is caused to flow, in the form of pulsations or shock waves, to turbine 28 wherein pulses of the mixture impact on the blades 28*a* of the turbine 28, and thus drive the turbine. The gas and mercury mixture is then collected and transported to the separation tank 32 wherein the gas is separated from the mercury and is caused to bubble through the mercury in the series of heater tanks 36, 28, 40 and 42 thereby creating frictional forces and heating the mercury. The heated mercury is ultimately delivered to the injector 26 for injection into mixing chamber 16 while the separated gas is returned to compressor 10.

Turning now to liquid turbine-generator units 17 mentioned above, these units are installed at regularly spaced points (e.g., every 500 meters in a specific embodiment) along the descent of the supply pipe 14 down, e.g., the mountain and each comprises a liquid turbine 56 and an electrical generator 58 driven by the associated turbine 56. This approach breaks the high pressure generated as the liquified gas travels down pipe 14 and avoids the serious problem created by the heat that would otherwise be generated by the high pressure flow. The turbines 56 each convert the gravitational force produced by the liquified gas into a rotational force for driving the associated generator 58. The high pressure supply line or conduit 14 is of a diameter chosen such that the required pressure is produced while the frictional forces exerted on the conduit walls are minimized. The electrical energy produced by generators 58 is then used to power the rest of the system. Thus, energy produced as the result of differences in elevation is converted into electrical energy to drive the overall system.

Heat is necessary at the end of the process taking place at the bottom of the mountain to convert the liquified gas into a gaseous state for travel through line 54 back to compressor 10. In the first instance, heat from the liquified gas supply line 14 is used in driving turbine 28 and to generate surplus energy in accordance with the basic aim of the system as described above. The heat needed is further provided in a natural way, by compression, using the remaining pressure to inject the gas into mercury thereby causing the gas to be heated by the bubbling thereof through the mercury as discussed hereinbefore. The heated gas will then easily travel upwardly and will lose heat during this travel before reaching the compressor 10 at the completion of the overall cycle. Thus, the energy generated at various points along the way is efficiently utilized.

The problem of the heat created as the liquified gas travels down the supply pipe 14 could also be combatted by cooling of the pipe 14. This can be done by employing an outer shell or conduit and using some of the gas from the main conduit to provide cooling of the space between the main and outer conduits. A liquid turbine at the bottom of the mountain would then be used to generate electrical energy for the heater and other electrical uses.

It is also noted that cooling rather than heating can be provided by reversing the heating process described above. Mercury can be used to compress the gas and drawing or sucking the gas through the mercury enables the use of the low boiling point gasses employed in conventional cooling systems. The cost of such cooling can be decreased and the needed compressible forces reduced because use is made of the natural compression exerted by mercury on a single bubble.

Figure 2:
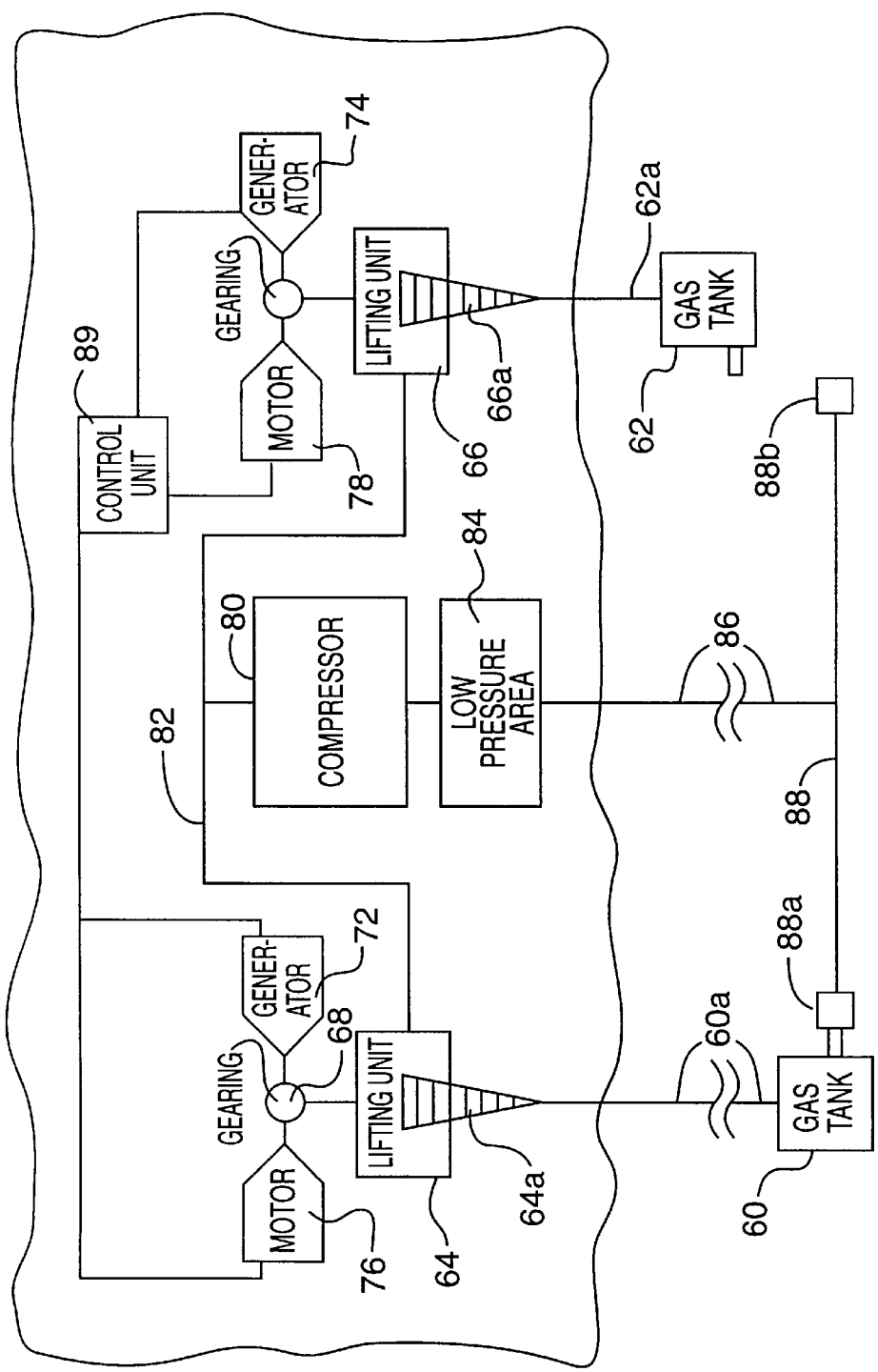
FIG. 2 is a schematic diagram of an energy generating system in accordance with a further preferred embodiment of the invention.

Referring to FIG. 2, a further embodiment of the invention is shown. In this embodiment, the differential elevation between two locations, e.g., one at or near the top of a mountain near the edge of a cliff or precipice and another at the bottom of the mountain or a substantial distance down the mountain, is employed in combination with a pair of weights which are raised and lowered and which are used to generate a driving force when lowered. In this embodiment, the two weights comprise first and second tanks or containers 60 and 62 which are lifted and lowered by respective lifting units or devices 64 and 66. Lifting units 64, 66 are located at the upper elevation and can take a number of different forms. In general, the units 64, 66 would include a drum or reel (not shown) for respective connection cables 60*a* and 62*a* such that the rotary motion of the drum during lowering of a weight (tank) 60 or 62 can be harnessed for use. In the illustrated embodiment, the units 64 and 66 include respective cranes or derricks 64*a* and 66*a* which extend over the side of the associated cliff or precipice to permit the weights 60 and 62 to be lifted up and lowered down the mountainside. The drive motion created by the lifting units 64 and 66 during the lowering of a weight (tank) is coupled by suitable gearing assemblies or units 68 and 70 to provide driving of respective generators 72 and 74. Electric motors 76 and 78 are employed to drive the lifting devices 64 and 66, respectively, to thereby provide lifting of the associated tanks 60 and 62. Generators 72 and 74, when driven, provide electrical energy which can be used for various purposes including providing electricity for remote locations and a portion of which can be stored to drive motors 76 and 78.

The system of FIG. 2 also includes a pressurized gas system including a compressor 80 for compressing and liquefying gas in the system. The liquified gas is supplied, through a high pressure pipe or piping arrangement 82, to lifting units 64 and 66. A conventional filling arrangement (not shown), with suitable filling nozzles and cut off valves, is used to fill the tanks 60 and 62 with liquified gas from pipe 82. Compressor 80 is connected to a low pressure area or tank 84 which is, in turn, connected to low pressure pipe 86 that extends from the upper elevation to the lower one. A further low pressure feed pipe or line 88 at the lower elevation extends between the sites to which gas tanks 60 and 62 are lowered so that gas can be discharged from tanks 60 and 62, through respective couplings 86*a* and 86*b*, into pipe or line 88 so that the gas will rise within connecting pipe 86 for ultimate compression by compressor 80.

In operation, one of the tanks 60 or 62 will be at the upper elevation, e.g., at the top of a cliff, and the other will be at the lower elevation, e.g., at the bottom of the cliff. In the illustrative example about to be considered, it will be assumed that tank 62 is at the top elevation and tank 60 is at the lower elevation and that the starting point for the operation is the filling of this upper tank 62 by liquified gas supplied to lifting unit 66 through high pressure pipe 82. A brake (not shown) associated with lifting unit 66 is then released, so that the liquid gas filled tank 62 descends down the side of the cliff and the resultant rotational force produced drives generator 74.

At the same time, motor 76 is connected to a source of electricity (which may be electrical energy stored during a previous cycle). Motor 76 is energized to drive lifting unit 64 through gearing assembly 68 and thus lift the empty tank 60 (which is, of course, disconnected at this time from pipe coupling 88*a*). When the full tank 62 reaches the lower elevation, the empty tank 60 can be lifted to the upper elevation. It will be appreciated that this process can be controlled by controlling the lifting and lowering speeds so that a substantially continuous operation can be maintained. Thus, as the gas is released from the full tank 62, liquified gas from pipe 82 is used to fill up empty tank 60. When tank 60 is full, the brake (not shown) associated with lifting unit 64 is released and the rotational force produced by the falling tank is used to drive generator 72.

The cycle will, of course, continue in this manner, thereby providing alternative lifting and lowering of the gas tanks 60 and 62. A control unit or controller 89 can be used to control this operation by controlling the times during which motors 76 and 78 are energized and for providing for transfer of electricity generated by the generators 72 and 74 to an electrical energy storage device for use, as needed, in the system by the active motor 76 or 78 or by a remote consumer.

Figure 3:
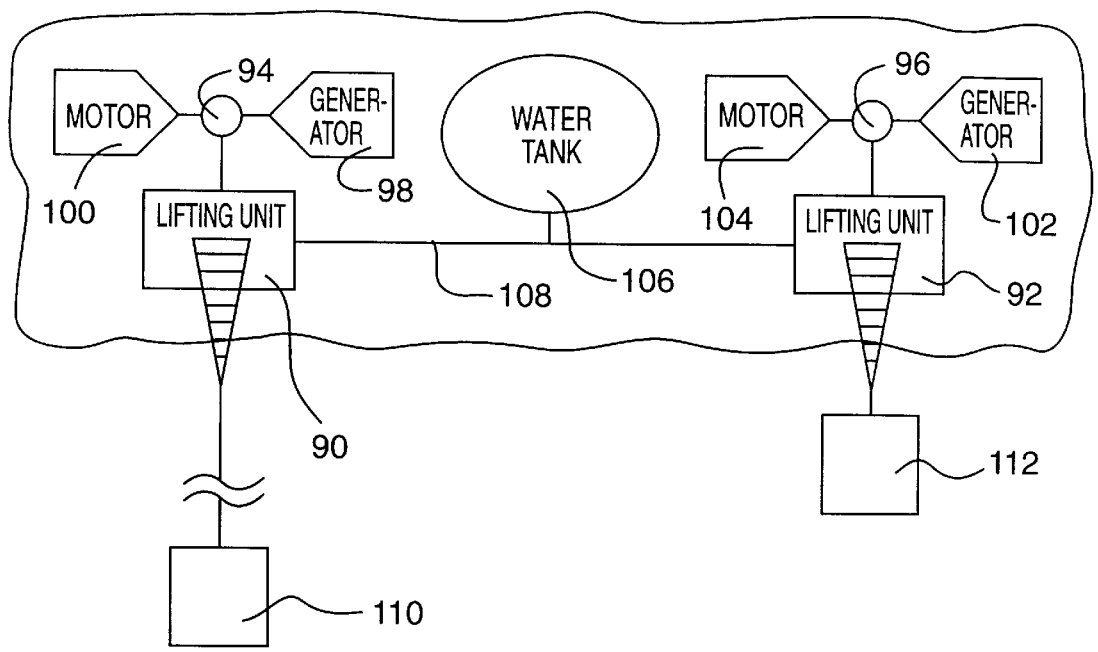
FIG. 3 is a schematic diagram of an alternative implementation of the second preferred embodiment of the invention.

A further embodiment using weights which are lifted and lowered is illustrated in FIG. 3. This embodiment is similar to that of FIG. 2 and includes a pair of lifting units 90 and 92 connected through respective gear assemblies 94 and 96 to a generator 98 and an electric motor or engine 100, and to a generator 102 and an electric motor or engine 104. In this embodiment, water from a water storage tank 106 is supplied through piping 108 to the lifting units 94 and 96 for use in filling a pair of tanks 110 and 112 which act as weights and which are lifted and lowered in a manner similar to tanks 60 and 62 of FIG. 2. In other words, the weight added to the tanks 110 and 112 is provided by filling the tanks with water stored at the upper elevation in water storage tank 106. As in the embodiment of FIG. 2, a control unit 111 controls the times during which motors 98 and 102 are energized and controls transfer of energy from generators 100 and 104.

It will be appreciated that this approach can be particularly advantageous in a locale where water is relatively plentiful at high elevations (e.g., in the mountains) and is either unavailable or a scarce commodity at lower elevations (e.g., in desert lowlands). With this embodiment, both water and energy is provided by lowering the weights (tanks) 110 and 112. It will be understood that the operation is otherwise generally the same as described above, i.e., when the tanks 110 and 112 are selectively filled in sequence, the force produced by lowering one of the respective tanks 110 or 112 is used to drive the corresponding generator 98 or 102 while the respective electric motor or engine 100 or 104 is used to lift the other tank. In this way electrical power can be generated by generators 98 and 102 for use, e.g., in remote areas.

In an alternative implementation of the embodiment of FIG. 3, for use in areas where there is snow at the higher elevation, tanks or containers 110 and 112 shaped to provide a dumping capability so that the tanks can be filled with snow and ice at the top to augment the weight of the containers 110 and 112 and then dumped at the bottom after the containers 110 and 112 are lowered.

Figure 4:
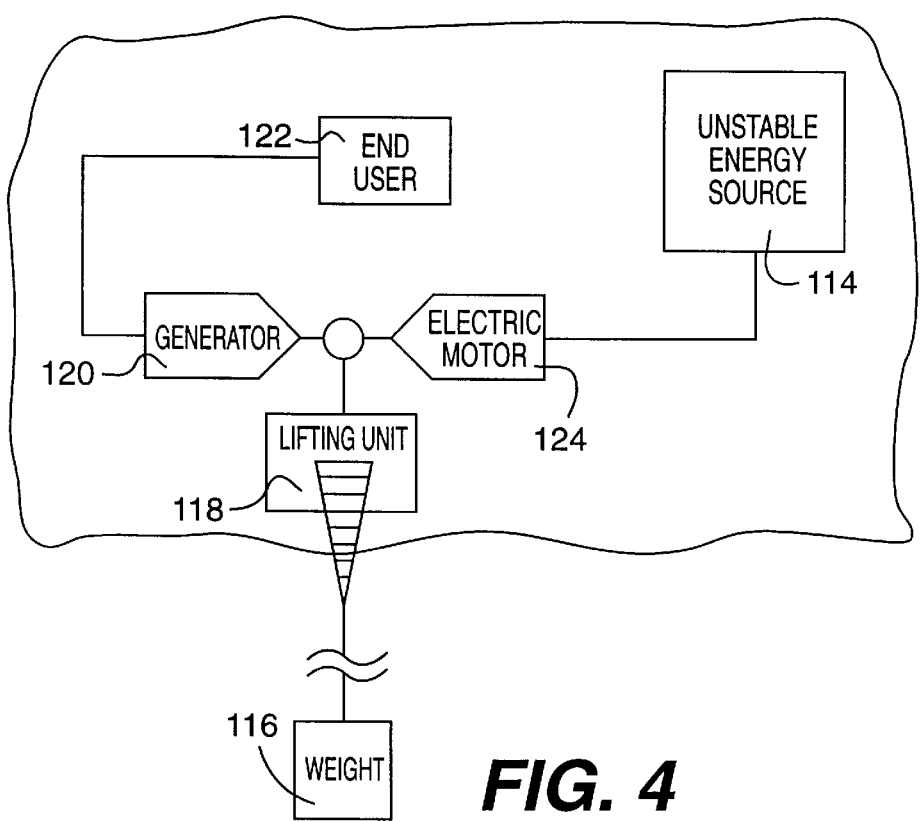
FIG. 4 is a schematic representation of further preferred embodiment related to the embodiments of FIGS. 2 and 3.

Referring to FIG. 4, a further embodiment of this aspect of the invention is shown. This embodiment is used in connection with an unstable source of energy, denoted 114, such as those using solar energy, wind or the like. In this embodiment, a single weight 116 is employed and a lifting unit 118 is used to lift and lower the weight 116. The weight 116 can be of the nature described above or can simply be a weighted unit of any type. As in other embodiments, the rotational force generated during the descent of the weight 116 are used to drive a generator 120 which can be used to supply electricity to an end user or remote consumer indicated at 112. The power for the lifting of weight 116 is provided by an electric motor 124 which is of the same size, i.e., capacity, as generator 120. Thus, in this embodiment, weight 116, in its raised state, is used to store energy which can then be used during periods when the unstable energy source 114 is not producing or cannot produce energy (i.e., for a solar device, periods where there is no sun or for windmill or the like, periods where there is light wind or no wind and thus does not supply energy to end user 112). A tower 118a can be used to provide raising of the weight 116 to a suitable level to provide the required potential energy. After use, the weight 116 can be raised again when unstable energy source 114 is active and thus can supply energy to motor 124. It will be appreciated that the source of potential energy provided by weight 116 in the raised position assists in evening out or making more uniform the overall energy that can be supplied from the system to end user 112. A control unit 124 controls the supply of energy to motor 124 from source 114 and coordinates the supply of energy to the end user 122 from source 114 and generator 120.

Although the present invention has been described to specific exemplary embodiments thereof, it will be understood by those skilled in the art that variations and modifications can be effected in these exemplary embodiments without departing from the scope and spirit of the invention.

What is claimed is:

1. A system for generating energy using the difference in elevation between a relatively high elevation and a relatively low elevation, said system comprising:

a first container;

a first lifting device for lifting said first container along a first vertical path having substantially no horizontal component from said relatively low elevation to said relatively high elevation, and for enabling lowering of said first container along said first vertical path from said relatively high elevation to said relatively low elevation, said first lifting device including a first rotary means and a first lifting cable having a first end connected to said first container and a second, opposite end connected to said rotary means such that rotation of said rotary means causes winding of said cable onto said rotary means and lifting of said first container and lowering of said first container causes rotation of said first rotary means;

a second container;

a second lifting device for lifting said second container along a second vertical path having substantially no horizontal component from said relatively low elevation to said relatively high elevation and for enabling lowering of said second container along said second vertical path from said relatively high elevation to said relatively low elevation, said second lifting device including a second rotary means and a second lifting cable having a first end connected to said second container and a second, opposite end connected to said second rotary means such that rotation of said second rotary means causes winding of said cable onto said second rotary means and lifting of said second container and lowering of said second container causes rotation of said second rotary means;

a first generator associated with said first lifting device;

first energy conversion means for converting rotational energy produced by said first rotary means during lowering of said first container into a driving force for said first generator;

a first electric motor for driving said first rotary means of said first lifting device during lifting of said first container;

a second generator associated with said second lifting device;

second energy conversion means for converting rotational energy produced by said second rotary means during lowering of said second container into a driving force for said first generator;

a second electric motor for driving said second rotary means of said second lifting device during lifting of said second container;

supply means for supplying weight augmenting matter to said first and second containers at said relatively high elevation for discharge from the containers at said relatively low elevation; and control means for controlling said first and second electric motors.

2. A system as claimed in claim 1 wherein said weight augmenting matter comprises water and said system further comprises, located at said relatively high elevation, a water storage tank and piping means for supplying water from said water storage tank to said containers.

3. A system as claimed in claim 1 wherein said weight augmenting matter comprises snow supplied to said containers at said relatively high elevation.

4. A system for generating energy using the difference in elevation between a relatively high elevation and a relatively low elevation, said system comprising:

a weight;

a lifting device for lifting said weight from said relatively low elevation to said relatively high elevation and for enabling lowering of said weight from said relatively high elevation to said relatively low elevation;

a generator for producing electrical energy for consumption;

conversion means for converting energy produced by said lifting device during lowering of said weight into drive energy for driving said generator;

an electric motor for driving said lifting device to provide lifting of said weight into drive energy for driving said generator;

an intermittently operating energy producing device, separate from said lifting device, generator, conversion means and electric motor, for generating further electrical energy for consumption, in addition to said electrical energy generated by said generator, responsive to an energy source other than said lifting device, and for supplying some of said further electrical energy to said electric motor during operation of said energy producing device to drive said generator and to enable lifting of said weight by said lifting device whereby said weight can be lifted during operation of said energy producing device to provide potential energy for the system.

5. A system as claimed in claim 4 wherein said energy source comprises a solar powered energy source.

6. A system as claimed in claim 4 wherein said energy source comprises a wind powered energy source.

* * * * *